Oct. 15, 1929.  C. PROHASKEY  1,732,168
AUTOMOBILE TIRE LOCK
Filed March 11, 1927
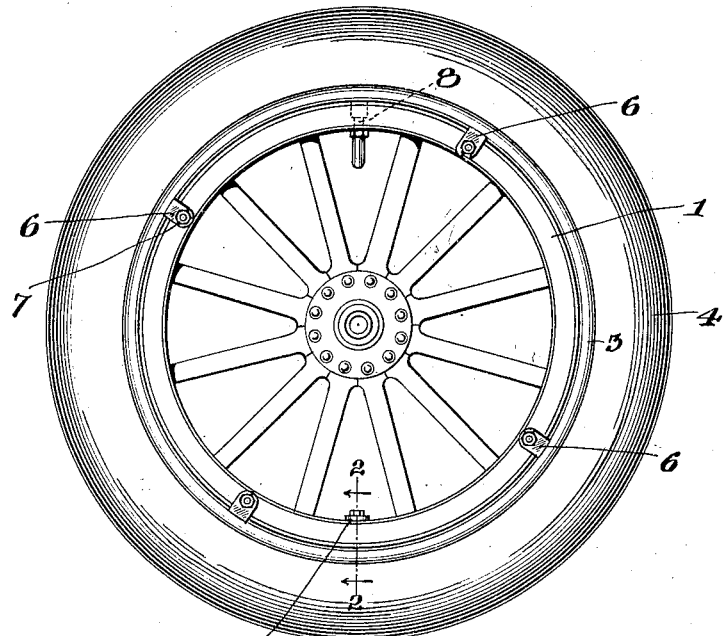
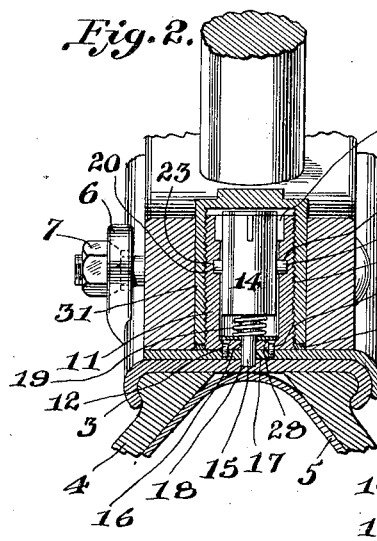
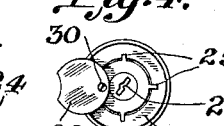
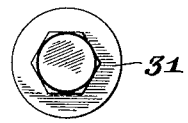
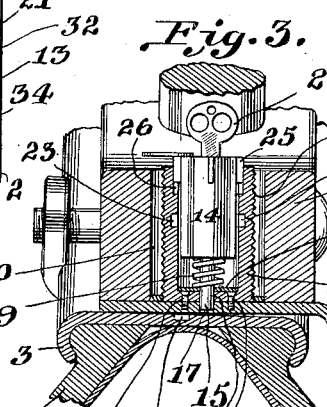
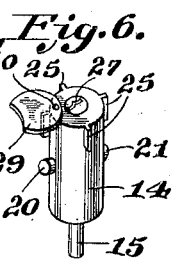
Inventor
Charles Prohaskey
By Bason Fenwick Lawrence
Attorneys Patented Oct. 15, 1929

1,732,168

UNITED STATES PATENT OFFICE

CHARLES PROHASKEY, OF LARKSVILLE, PENNSYLVANIA

AUTOMOBILE TIRE LOCK

Application filed March 11, 1927. Serial No. 174,655.

This invention relates to improvements in automobile tire locks, particularly locking devices adapted to prevent the unauthorized removal of tires and rims from the wheels to which they are applied.

An object of this invention is to provide an automobile tire locking device which will operate to make it impossible to chisel or pry the tires from the wheels, and at the same time, a lock which is simple of construction and easy to operate.

A further object of this invention is to provide a tire locking device having efficient means for maintaining the locking element free from dust and dirt.

Other objects will appear from the following detailed description of the device, and as disclosed in the single sheet of drawing which is herewith made a part of this application.

In the drawings—

Figure 1 illustrates a plan view of an automobile wheel disclosing a tire in interlocked relationship thereto.

Figure 2 represents a sectional view to an enlarged scale along the lines 2—2 disclosed in Figure 1, showing the locking device in assembled relationship with the cooperating element of the wheel and tire.

Figure 3 illustrates a view similar to that of Figure 2 disclosing the locking element in released position and the tire rim and casing about to be removed from the wheel.

Figure 4 represents a plan view of the lock in assembled relationship with the cylindrical receptacle therefor, also disclosing the dust cap.

Figure 5 represents a top plan view of the auxiliary dust cap.

Figure 6 represents a perspective view of a modification of the specially constructed lock used in this invention.

Numeral 1 designates the felly of an automobile wheel, or any other suitable element having a rim portion 2 of the type common to automobile wheels for receiving a tire rim 3 in combination with an ordinary casing portion 4 and inner tube element 5 of automobile tires. In usual practice the tire 4 may be, without undue labor, easily removed from the wheel portion 2 by means of releasing the lug and bolt elements 6 and 7 from the felly 1 of the wheel, after which the tire may easily be pried loose from the wheel and separated from its locked relationship with valve 8 of the tire. In order to prevent this operation from being accomplished by unauthorized persons, this invention provides a suitable locking device diametrically opposite to the valve 8 in the felly of the wheel as clearly disclosed at 9 in Figure 1. The locking device, according to this invention, comprises a suitable opening in the felly of the wheel as at 10 for receiving a cylindrical element 11 made of any suitable material, one end being inwardly flanged and adapted to be securely fastened to the felly rim 2 of the wheel by means of machine screws or other fastening devices 12 and 13. The upper end of the cylindrical element 11 is adapted to be opened for receiving a specially formed lock 14 arranged in slidable relationship with the inner periphery of cylinder 11. The lock 14 may be of any suitable construction or type having, preferably, a downwardly extending plunger portion 15 adapted to extend through the opening in the lower portion of the cylinder 11 and the felly 2 of wheel as at 16 and 17 and into a groove portion 18 of the tire rim 3. The main portion 14 of the locking element is adapted to be of such a length that when the plunger element 15 is interlocked with the tire rim 3 in the notch 18, a sufficient space is left between the main body 14 of the lock and the lower part of the cylinder 11 to allow for the spring tension element 19 which will function to automatically release the plunger 15 from the groove 17 when the locking plunger elements 20 and 21 have been released by means of a key 22 or otherwise from their interlocked relationship with the notches 23 and 24 located at the proper points in the inner periphery of the cylinder 11. The spring 19 functions to raise the lock 14 in a positive direction owing to the guiding elements 25 located around the upper periphery of the main body portion of the lock 14, the guiding lugs 25 being adapted to slide in cooperating relationship with suitable grooves 26 located around the upper inner periphery of the cylinder 11. The lock 14 and bolt portions 20 and 21 may be brought into operative relationship by means of an ordinary key such as 22 adapted to be inserted in the key hole 27. A gasket for receiving the spring element 19 may be located at the base of the cylinder 11 as at 28.

In Figure 2 the locking device is disclosed in interlocked relationship with the tire rim and the felly and felly rim of an automobile wheel, and in order to prevent dust and dirt from entering the lock portion 14, a suitable dust cap 29 is adapted to be pivotally connected to the main body portion of the lock 14 as at 30 in such a manner that it may easily be swung into position over the lock and particularly the key hole 27. Additional means for maintaining a dust and dirt proof condition of the lock is provided in the form of a cap 31 preferably threaded on the inside periphery as at 32 in order to cooperate with the threaded portion preferably arranged on the external periphery of the cylinder 11 as at 33, the felly of the wheel 1 being provided with an opening 10 sufficiently large to receive the auxiliary cap 31. In order to maintain an additional dust proof condition and to prevent water from entering a gasket portion 34 may be positioned within the opening 10 for contacting with the auxiliary dust cap 31, it being understood that the gasket 28 at the bottom of the cylinder 11 may also function to prevent water entering the cylinder.

In operation, this invention provides an automobile tire locking device which may be easily and inexpensively attached to the average automobile wheel and is preferably located diametrically opposite to the tire valve stem, thereby forming a very efficient locking element and effectively functions to prevent the unauthorized removal of the tires and rims from wheels to which they are applied. The manner of using the device is extremely simple. The main body portion of the lock may be of any suitable construction of a common make and adapted to be inserted within a properly formed groove within the felly or other suitable portion of the wheel. In order to securely lock the tire and rim in position on the wheel so that it cannot be chiseled or pried off, the lock is adapted to be slidably positioned within the cylindrically formed receptacle fastened to the felly rim of the wheel. The lock element being easily forced into position against the tension of the spring element located within the receptacle by means of hand pressure and the interlocking element may then be securely locked into position by means of an ordinary key element, thereby bringing the plunger of the lock into cooperating relationship with the interlocking groove in the tire rim. The key may then be removed from the lock and the dust cap element located in position over the key hole, after which the auxiliary cap element may be screwed into its position thereby completely covering the locking device and maintaining it in a dust and water proof condition.

In order to release the locking device, it is merely necessary to remove the auxiliary cap, throw the pivoted dust cap out of position and insert the key in the key hole of the lock, when the plunger elements are released from their interlocked relationship with the cylindrical receptacle, the tension of the spring will act to immediately raise the plunger of the lock from its interlocked relationship with the tire rim, the movement of the lock within the cylindrical receptacle being assured of a positive motion by means of suitable guiding elements on the lock adapted to cooperate with grooves in the cylindrical receptacle. After the plunger of the lock has been released from its locked relationship with the tire rim, the usual procedure in the removal of a tire may be easily accomplished.

This invention is particularly applicable as a device for preventing the removal of tires and rims from any suitable wheel of the ordinary type now in common use.

It is to be understood that substitutions and alterations may be made in the above disclosure within the scope of the claim without affecting the merits of this case.

What I claim is:—

The combination with an automobile wheel having a felly portion and a felly rim, of a tire and rim, of a valve stem, of means for interlocking the tire rim and wheel for preventing unauthorized removal consisting of a suitably formed locking element comprising a plunger for interlocking the tire rim positioned within the felly of the wheel, of a cylindrical receptacle fastened to the felly rim for receiving the locking element in slidable relationship thereto.

In testimony whereof I affix my signature.

CHARLES PROHASKEY.